(12) United States Patent
Biais et al.

(10) Patent No.: US 6,674,205 B2
(45) Date of Patent: Jan. 6, 2004

(54) AUXILIARY MAGNETIZING WINDING FOR INTERIOR PERMANENT MAGNET ROTOR MAGNETIZATION

(75) Inventors: Francois J. Biais, Chatou (FR); Khwaja M. Rahman, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 12 days.

(21) Appl. No.: 10/140,918

(22) Filed: May 7, 2002

(65) Prior Publication Data

US 2003/0209950 A1 Nov. 13, 2003

(51) Int. Cl.[7] ............................. H02K 21/22; H01F 7/02
(52) U.S. Cl. ........................ 310/156.53; 310/156.53; 310/44; 310/181; 335/286; 335/284
(58) Field of Search ........................... 310/156.53, 156, 310/44, 181; 335/284

(56) References Cited

U.S. PATENT DOCUMENTS

| 3,678,436 | A | * | 7/1972 | Herdrich | 335/284 |
| 5,536,985 | A | * | 7/1996 | Ward et al. | 310/44 |
| 5,747,909 | A | * | 5/1998 | Syverson | 310/156 |
| 5,955,807 | A | * | 9/1999 | Kajiura | 310/156 |
| 6,144,130 | A | * | 11/2000 | Kawamura | 310/156 |
| 6,147,429 | A | * | 11/2000 | Akemakuo | 310/181 |
| 6,218,753 | B1 | * | 4/2001 | Asano | 310/156 |
| 6,274,962 | B1 | * | 8/2001 | Kliman | 310/261 |
| 6,396,183 | B1 | * | 5/2002 | Tajimat | 310/156.53 |

* cited by examiner

Primary Examiner—Thomas M. Dougherty
Assistant Examiner—Iraj A. Mohandesi
(74) Attorney, Agent, or Firm—Christopher DeVries

(57) ABSTRACT

A method and apparatus for fabricating a rotor for an electric traction motor including forming cavities in the rotor, injecting magnetic material in a portion of the cavities, configuring an electrical winding in a portion of the cavities, and post-magnetizing the magnetic material.

19 Claims, 3 Drawing Sheets

US 6,674,205 B2

AUXILIARY MAGNETIZING WINDING FOR INTERIOR PERMANENT MAGNET ROTOR MAGNETIZATION

TECHNICAL FIELD

The present invention relates generally to electric or hybrid electric vehicle propulsion systems. More specifically, the present invention relates to the design of electric traction motors or machines for use in electric or hybrid vehicles.

BACKGROUND OF THE INVENTION

In today's automotive market, there exists a variety of electric propulsion or drive technologies used to power vehicles. The technologies include electric traction motors such as DC motors, AC induction motors, switched reluctance motors, synchronous reluctance motors, brushless DC motors and corresponding power electronics. Brushless DC motors are of particular interest for use as traction motors in an electric vehicle because of their superior performance characteristics, as compared to DC motors and AC induction motors. Brushless DC motors typically operate with a permanent magnet rotor. A permanent magnet rotor may be configured as a surface mount or interior or buried permanent magnet rotor. An interior permanent magnet (IPM) motor or machine has performance attributes, when compared to DC motors and AC induction motors, that include relatively high efficiency, relatively high torque, relatively high power densities, and a long constant power operating range which make an IPM machine attractive for vehicle propulsion applications.

Permanent magnets buried inside a rotor for a brushless DC motor exhibit high reluctance directly along the magnetic axis or the d-axis due to the low permeability of the permanent magnets, while along the q-axis, between the magnetic poles or magnet barriers of an IPM rotor, there exists no magnetic barrier and reluctivity to magnetic flux is very low. This variation of the reluctance around the rotor creates saliency in the rotor structure of an IPM machine. Therefore, the IPM rotors have reluctance torque in addition to the permanent magnet torque generated by the magnets buried inside the rotor. Reluctance in the d-axis can be created by one magnet such as found in a single barrier rotor design.

A single magnet of the one barrier rotor design can also be split into several layers creating a multi-barrier design. The multi-barrier design reduces leakage and improves the rotor saliency. Accordingly, motors having multi-barrier rotors have numerous performance advantages over a single barrier rotor design, including relatively high overall efficiency, extended high speed constant power operating range, and improved power factor. Improved saliency of the multi-barrier rotor helps to lower the amount of magnets or magnetic material in an IPM machine, as compared to a single barrier IPM machine or surface mounted permanent magnet machine, by reducing dependency on magnetic torque. The amount of magnetic material needed to generate a specific torque and wattage rating depends on the level of saliency of the rotor. The higher the rotor saliency, the lower the amount of magnetic material usage for the same overall machine performance. Electric motors having a multi-barrier rotor design, as compared to single barrier design, generate higher rotor saliency.

Magnets in an IPM machine can be pre-magnetized and then inserted inside the rotor. This magnet insertion is a complex and relatively costly step that adds manufacturing steps to the assembly of the IPM machine.

Post-magnetization of inserted magnetic material is possible if the magnets are inserted near the rotor surface. For post-magnetization, magnetic material may be preformed outside of the rotor, inserted into the rotor, and then magnetized. This is usually the case with sintered magnets, which require a certain orientation. A further type of magnetic material used that may be used in an IPM rotor is bonded magnets, which are usually mixed with a plastic, such as PPS, and may also be preformed outside of the rotor and then inserted into the rotor. However, generally bonded magnetic material is injected into the rotor cavities under high temperature and pressure.

Electric motors having multi-layer buried magnets in their rotors, as shown in FIG. 2, exhibit excellent performance characteristics for vehicle propulsion application. The problems associated with post-magnetizing such a rotor geometry would result in a large amount of magnetic material buried deep within the rotor that may only partially magnetize or not magnetize at all, resulting in a waste of material. Post-magnetization works efficiently for magnetic material buried or located near the surface of the rotor. For magnetic material buried relatively deep in the rotor, post-magnetization is difficult due to the weakening of the magnetizing field.

SUMMARY OF THE INVENTION

The present invention includes a method and apparatus for the design of an IPM machine rotor. The present invention removes magnetic material from the regions of the rotor which cannot be effectively or strongly magnetized during the post-magnetization process and inserts magnetizing coils. The outer barriers of the rotor of FIG. 2 are relatively easy to magnetize. However, the middle section of the inner regions of the rotor may not be exposed to a magnetic field strong enough to fully magnetize these regions. In the present invention, magnetic material is removed from these middle section areas and magnetizing coils are inserted in the empty areas for the magnetization process. The inserted magnetizing coils will enhance the magnetizing field produced by the stator or other magnetizing fixture, thus improving the rotor magnetization. Keeping the middle section areas void of any magnetic material does not change the rotor saliency or the reluctance torque, provided that the remaining areas are filled with magnet material that is fully magnetized. Specifically, the bridges between voids and filled areas are saturated by the magnetic material so as to ensure saliency. The magnetizing coils that are inserted in the void areas for the magnetizing process will enhance the field in this region and help magnetize the magnetic material that may not be fully magnetized by the stator fixture. The magnetizing coils in the preferred embodiment are removed from the rotor following the post magnetization process.

DESCRIPTION OF THE PREFERRED EMBODIMENT

U.S. Ser. No. 09/952,319, assigned to the assignee of this invention, includes a detailed description of multi-layer motor geometry and is hereby incorporated by reference in its entirety.

Figure 1:
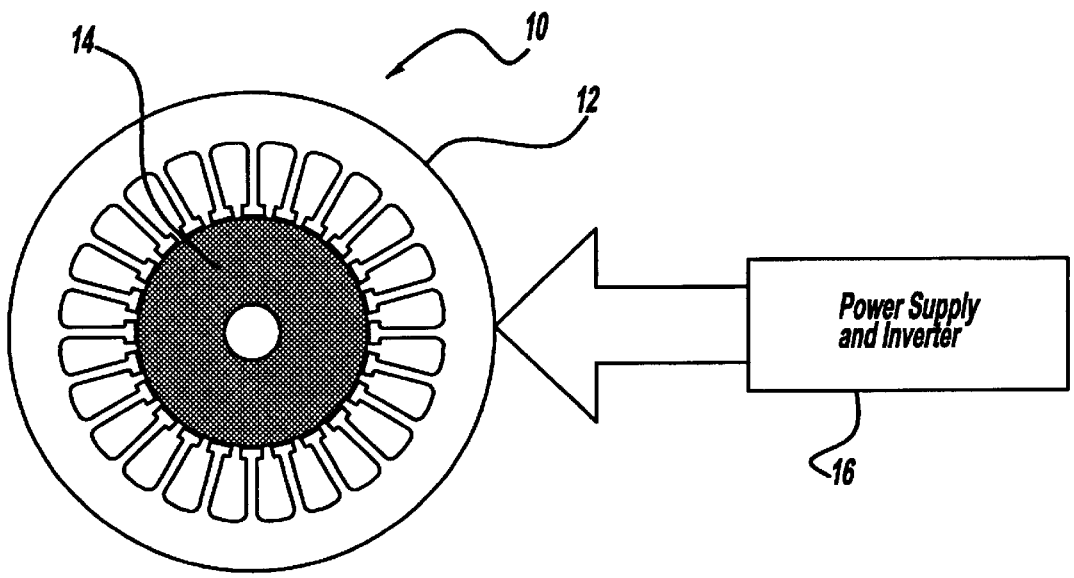
FIG. 1 is a diagrammatic cross-sectional drawing of a permanent magnet motor and controls.

FIG. 1 is a diagrammatic drawing of a permanent magnet motor 10 having a wound stator 12 and permanent magnet rotor 14. A power supply and inverter 16 commutate and control the speed and torque of the motor 10 in response to feedback including, but not limited to, an encoder, resolver, tachometer, proximity switch and tooth set, and back electro-motive force (emf) detection. The motor may be characterized as a brushless DC motor with square wave or sinewave excitation provided by the power supply and inverter 16.

Figure 2:
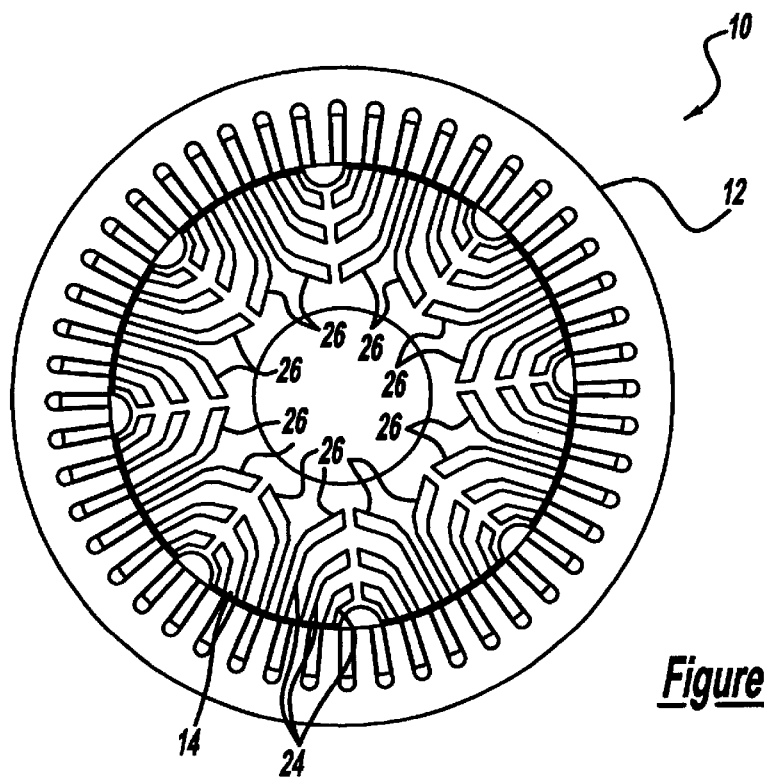
FIG. 2 is a cross-section of a multi-layer interior or buried magnet motor geometry.

FIG. 2 is a cross-section of a multi-layer/barrier buried magnet rotor geometry. Regions 26 of the magnetic material layers or barriers 24 will be difficult to fully magnetize because of the distance from the rotor 14 surface. The magnetic material layers 24 surface may be magnetized by a magnetizing fixture or the wound stator 12 during a post-magnetization process. The post-magnetization process in one embodiment of the present invention includes positioning a magnetizing fixture around the rotor 14 to magnetize the magnetic material in the rotor 14. Magnetizing fixtures similar to the stator 12 contain windings that are used for the magnetization process. The magnetizing fixture includes enough iron to prevent it from becoming very saturated. Windings in the magnetizing fixture are placed such that the magnetic field is guided along a desired magnetization direction.

In a preferred embodiment of the present invention, magnetic powder mixed with plastic may be injected into rotor cavities/barriers 24 under high temperatures and pressure, allowing the material to bond and form inside the rotor 14 cavity. This process is desirable for large scale production. As detailed previously, post-magnetization of the magnetic material is currently only practical if the magnetic material is buried near the rotor surface.

Magnetic material, depending on its composition, requires varying magnetic field strengths to become fully magnetized. The high energy magnets which are preferred for variable speed motor drive applications due to their higher demagnetization strength require very high magnetic fields to saturate the magnetic material to become fully magnetized. The magnetic field is produced by the flow of current in the stator 12 winding or in a magnetizing fixture. Usually a very high current burst is needed for a very short period of time to magnetize the rotor 14.

As described previously, multi-layer or barrier geometry for an IPM rotor improves the rotor 14 saliency. Accordingly, the rotor 14 geometry of FIG. 2 has the advantage of having relatively high saliency, improving the machine torque density and lowering the magnetic material volume requirements for a specific torque or wattage. Lower magnetic material volume requirements reduce the total motor cost and also alleviate the problems associated with high flux PM machines, such as short circuit and open circuit fault problems, and spin losses (eddy current induced losses) due to the presence of the permanent magnet field. Multi-barrier rotor geometries also have the advantage of favorable torque speed profile, with extended constant power range, for vehicle propulsion application. This multi-layer design may have magnetic material in all the layers 24 as shown in FIG. 2 or it may have magnetic material in one or more layers while the remaining layers are empty. The particular design depends on the magnet flux requirements, the type of magnetic material, and the saliency requirement. Despite all these favorable attributes, multi-layer designs are difficult to produce due to the difficulty of magnetizing all the magnet layers 24, especially the regions 26 of the layers 24.

Figure 3:
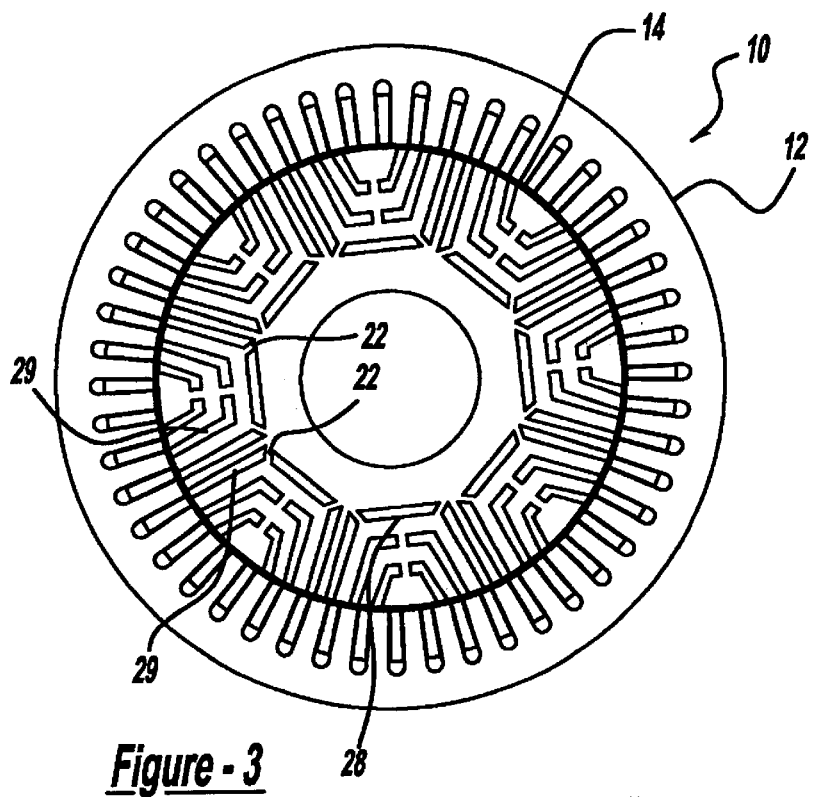
FIG. 3 is a cross-section of a multi-layer interior or buried magnet motor with an empty bottom barrier.
Figure 4:
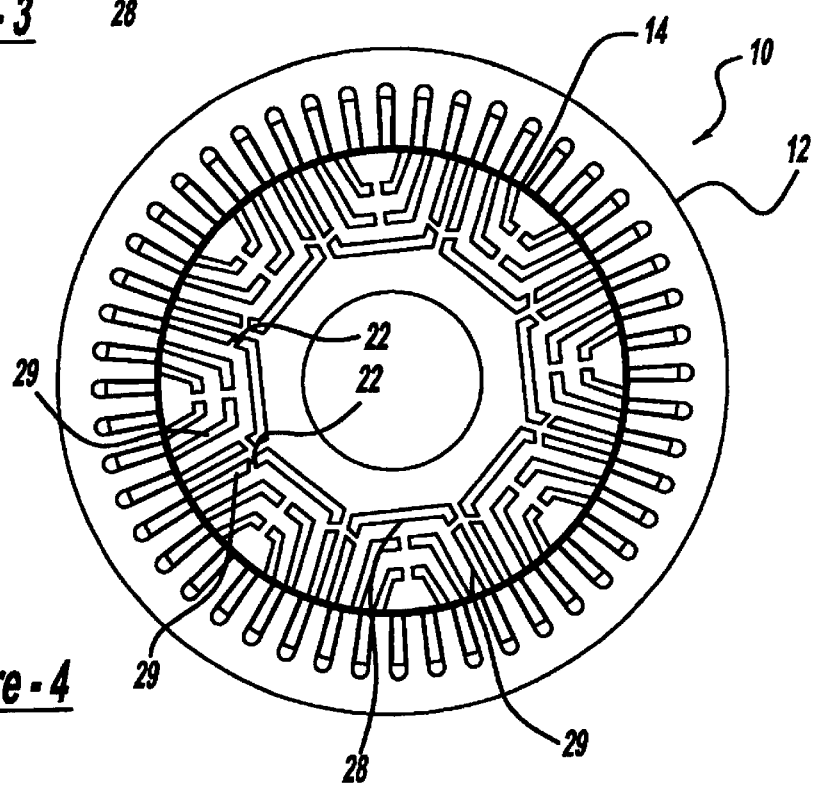
FIG. 4 is a cross-section of a multi-layer interior or buried magnet motor with an empty extended bottom barrier.

FIGS. 3 and 4 illustrate the removal of magnetic material from the central region or bottom barriers 28 of a multi-layer rotor 14. The present invention removes magnetic material from areas of the rotor 14, such as the regions 26 seen in FIG. 2, where it is difficult to magnetize the magnetic material. FIG. 3 illustrates rectangular bottom barriers 28 and FIG. 4 illustrates extended bottom barriers 28. Accordingly, the bridge 22 between the empty bottom barriers 28 and the filled barriers 29 has also been modified as seen in FIG. 4. The barrier geometry of FIG. 4 is more easily magnetized as compared to the barrier geometry of FIG. 3. However, the bridge 22 seen in FIG. 4 is subjected to more mechanical stress due to centrifugal force generated by the rotation of the rotor 14. Less magnetic material is used in the barrier geometry of FIG. 4 as compared to the barrier geometry of FIG. 3. Thus, to maintain the same airgap flux (i.e., torque) of the barrier geometry of FIG. 3, the magnetic strength of the filled barriers 29 of FIG. 4 must be larger than the magnetic strength of the filled barriers 29 of FIG. 3. The concentration of magnetic powder in the filled barriers 29 would be higher in the geometry of FIG. 4, as compared to the geometry of FIG. 3. Therefore, the geometry of FIG. 4 will be subjected to higher mechanical pressure and stress during the injection of moldable magnets into the filled barriers 29 during the fabrication of the rotor 14.

The torque ripple in the barrier geometry of FIG. 4 is also higher, as compared to the barrier geometry of FIG. 3. Therefore, although the barrier geometry of FIG. 4 may have a better chance to become fully magnetized, the barrier geometry of FIG. 3 is generally preferable. The present invention optimizes the performance of the barrier geometry of FIG. 3 with the inclusion of an auxiliary winding or windings for the enhancement of the magnetic field used to magnetize the filled barriers 29.

Figure 5:
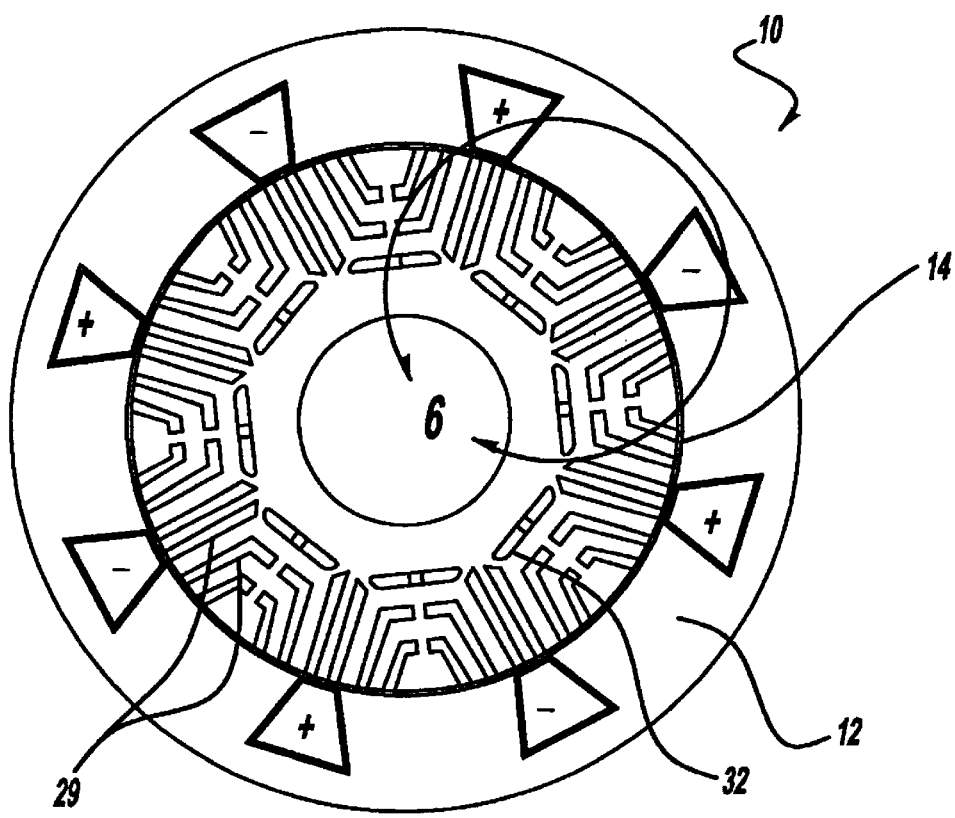
FIG. 5 is a cross-section of a multi-layer rotor geometry with a magnetizing auxiliary winding in the empty barriers of the rotor.
Figure 6:
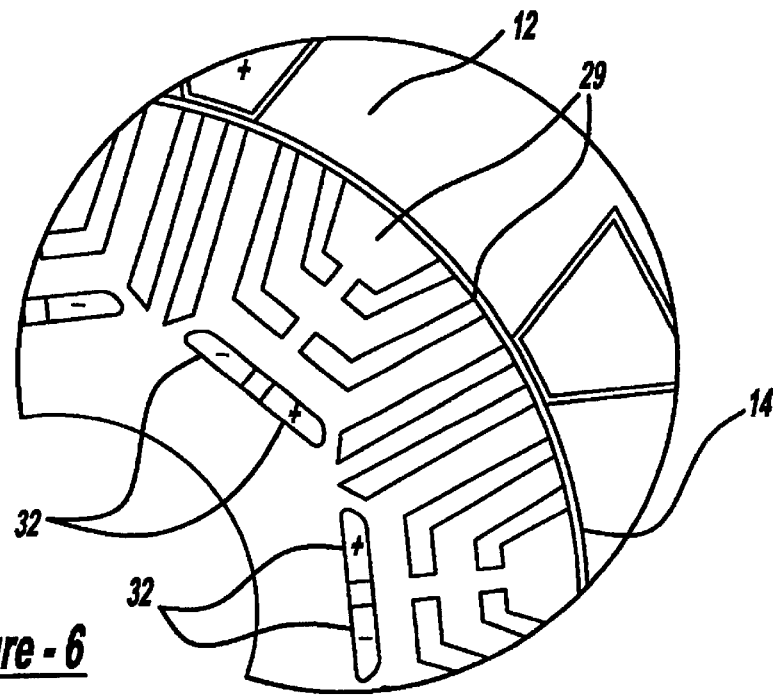
FIG. 6 is a detailed partial view of FIG. 5.

An auxiliary magnetizing coil or winding 32, as seen in FIGS. 5 and 6, is inserted into the empty barriers 28 for the magnetizing process for the barrier geometry of FIG. 3. The auxiliary magnetizing winding 32 will enhance the magnetizing field produced by the magnetization fixture 12, improving the magnetization of the inner part of the magnet barriers 29, which cannot be fully magnetized by the magnetization fixture. The auxiliary winding 32 is inserted in each empty barrier 28 one per rotor pole. Therefore, adjacent coils (from pole to pole) have their polarity reversed. The auxiliary windings 32 in the preferred embodiment are removed after the post-magnetization process.

FIG. 6 shows the details of the auxiliary winding. Each auxiliary magnetizing 32 winding comprises one complete coil having a one way and return side, and the coil 32 is wound around a core so as to provide a return path for the flux. The whole assembly is inserted in the empty cavity 28 for the magnetizing process. The auxiliary winding 32 is connected to a current source similar to the stator magnetizing fixture source, which provides the current burst for a short time. After the post-magnetization process, the magnetizing windings 32 are removed.

The auxiliary windings 32 can incorporate much less Ampere-turns than the stator magnetization fixture because of their smaller area. However, it has a significant effect on the magnetization of magnetic material within the rotor 14 due to its proximity to magnetic material. Moreover, the saturation in the deep part of the rotor 14 is less than near the rotor periphery. Therefore, the ampere-turn requirement is further reduced.

While this invention has been described in terms of some specific embodiments, it will be appreciated that other forms can readily be adapted by one skilled in the art. Accordingly, the scope of this invention is to be considered limited only by the following claims.

We claim:

1. An electric traction motor for a vehicle comprising:

a housing;

a wound stator field located in said housing;

a rotor magnetically interacting with said wound stator field, said rotor including a permanent magnet;

air spaces configured in said rotor;

windings located in said air spaces; an wherein said permanent magnet is post-magnetized in said rotor by said windings located in said air spaces.

2. The electric traction motor of claim 1 wherein said permanent magnet is an interior permanent magnet.

3. The electric traction motor of claim 1 further including an array of permanent magnets configured as interior permanent magnets.

4. The electric traction motor of claim 3 wherein said array of permanent magnets comprises sintered magnets.

5. The electric traction motor of claim 1 wherein said interior permanent magnet comprises magnetic powder.

6. The electric traction motor of claim 1 further including multi-layers of permanent magnets.

7. The electric traction motor of claim 1 wherein said interior permanent magnet is injected into said rotor in liquid form.

8. The electric traction motor of claim 1 wherein said air spaces are partially filled with a heat conducting material.

9. An electric traction motor comprising:

a housing;

a wound stator field located in said housing;

a rotor magnetically interacting with said wound stator field, said rotor including an array of cavities;

an electrical winding configured in said array of cavities; and wherein said electrical windings configured in said array of cavities post-magnetize magnetic material located in said rotor.

10. The electric traction motor of claim 9 wherein said magnetic material comprises a moldable magnet.

11. The electric traction motor of claim 10 wherein said binder is plastic.

12. The electric traction motor of claim 9 wherein a portion of said array of cavities is filled with inert material.

13. A method of fabricating a rotor for an electric traction motor comprising the steps of:

forming cavities in the rotor;

injecting magnetic material in a portion of the cavities;

configuring an electrical winding in a portion of the cavities; and post-magnetizing the magnetic material.

14. The method of claim 13 further comprising the step of removing the electrical winding from the cavities.

15. The method of claim 13 further comprising the step of bonding said magnetic material with a plastic.

16. An electric traction motor comprising:

a housing;

a wound stator field located in said housing;

a rotor magnetically interacting with said wound stator field, said rotor including an array of cavities;

magnetic material configured in said rotor;

an electrical winding configured in said array of cavities; and wherein said electrical windings configured in array of cavities and said wound stator field post-magnetize said magnetic material located in said rotor.

17. The electric traction motor of claim 16 wherein said magnetic material is comprises a bonded magnetic powder mixed in some proportion with a binder.

18. The electric traction motor of claim 16 wherein said magnetic is injected into said rotor in liquid form.

19. An electric traction motor of a vehicle comprising:

a housing;

a wound stator field located in said housing;

a rotor magnetically interacting with said wound stator field, said rotor including permanent magnet;

air spaces configured in said rotor;

windings located in said air spaces; and wherein said permanent magnet is post-magnetized in said rotor by said windings located in said air spaces and said wound stator field.

* * * * *